United States Patent [19]
Ikeda et al.

[11] Patent Number: 5,127,083
[45] Date of Patent: Jun. 30, 1992

[54] OPTICAL FIBER BUILT-IN TYPE COMPOSITE INSULATOR AND METHOD OF PRODUCING THE SAME

[75] Inventors: Mitsuji Ikeda, Nagoya; Masayuki Nozaki, Ama; Masao Nishioka, Nagoya, all of Japan

[73] Assignee: NGK Insulators, Ltd., Japan

[21] Appl. No.: 669,006

[22] Filed: Mar. 13, 1991

[30] Foreign Application Priority Data

Mar. 27, 1990 [JP] Japan .................... 2-75607

[51] Int. Cl.⁵ .............................. G02B 6/36
[52] U.S. Cl. .................... 385/138; 174/139; 174/151; 385/134; 385/147
[58] Field of Search ............ 350/96.10, 96.20, 96.21, 350/99.22, 96.23, 96.29, 96.30; 174/138 R, 139, 151, 152 R; 385/100, 101, 134–139, 147

[56] References Cited

U.S. PATENT DOCUMENTS

| | | | |
|---|---|---|---|
| 4,214,809 | 7/1980 | Reh | 350/96.20 |
| 4,316,204 | 2/1982 | Inagaki et al. | 357/30 |
| 4,610,033 | 9/1986 | Fox, Jr. | 174/139 X |
| 4,810,836 | 3/1989 | Shinoda et al. | 174/139 |
| 4,919,217 | 4/1990 | Mima et al. | 174/139 |
| 4,921,322 | 5/1990 | Seike et al. | 350/96.20 |
| 4,984,860 | 1/1991 | Seike et al. | 350/96.10 |
| 5,029,969 | 7/1991 | Seike et al. | 350/96.20 |

FOREIGN PATENT DOCUMENTS

| | | |
|---|---|---|
| 0364288 | 4/1990 | European Pat. Off. . |
| 0372867 | 6/1990 | European Pat. Off. . |
| 3544142 | 6/1986 | Fed. Rep. of Germany . |
| 62-20418 | 1/1987 | Japan . |

Primary Examiner—John D. Lee
Attorney, Agent, or Firm—Parkhurst, Wendel & Rossi

[57] ABSTRACT

An excellent optical fiber built-in type composite insulator is provided having a reliable and durable sealing portion in a central axis penetration hole of the insulator for sealing the optical fiber in a very quick, simple and economical way with reduced members, devices and production steps. The composite insulator includes a ceramic insulator having a penetration hole in its central axis portion, at least one optical fiber inserted in the penetration hole, and sealing portions made of inorganic glass arranged at both ends of the penetration hole for sealing the optical fiber therein, and comprises recessed portions of the ceramic insulator arranged around the ends of the penetration hole, and heat generating elements arranged in the recessed portions for heating and melting the inorganic glass to form the sealing portions at the both ends of the penetration hole. The present invention provides also a method of producing the composite insulator.

2 Claims, 2 Drawing Sheets

FIG._4 _PRIOR ART_
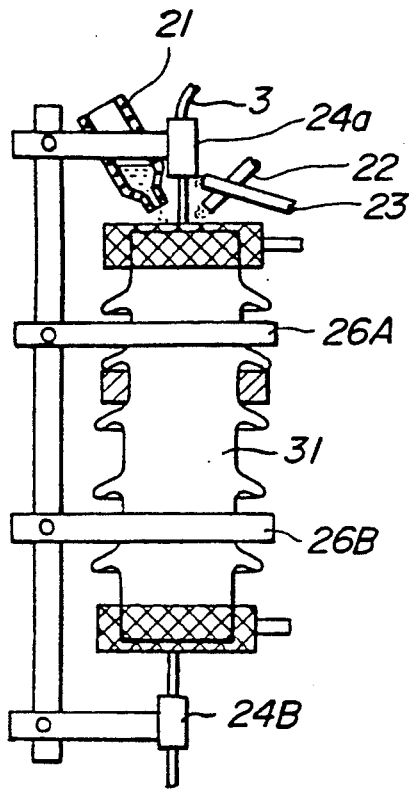
FIG._5 _PRIOR ART_
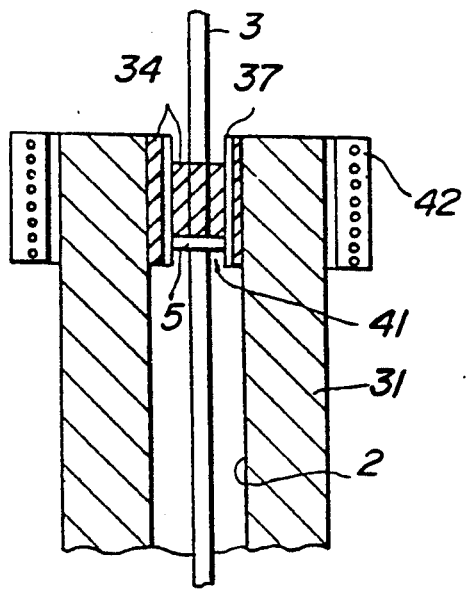

OPTICAL FIBER BUILT-IN TYPE COMPOSITE INSULATOR AND METHOD OF PRODUCING THE SAME

BACKGROUND OF THE INVENTION

1. Field of the Invention

The present invention relates to optical fiber built-in type composite insulators which are mainly used in detection systems for finding fault points at electric power transmission lines and transformer substations, etc., and a method of producing the same.

2. Related Art Statement

Heretofore, in order to automatically find fault points in electric power systems, optical fiber built-in type composite insulators have been used which are capable of transmitting signals from optical sensors at a power supply side to detectors at a grounded side and maintaining an electrical insulative property.

Various types of optical fiber built-in type composite insulator are known. Among them, a technique is known wherein a penetration hole is bored in the axis of a ceramic insulator body, one or two optical fibers are inserted in the penetration hole, and a portion or the whole of the penetration hole is filled with an organic insulative material, such as silicone rubber or epoxy resin, etc., to seal the optical fiber in the penetration hole and prevent decrease of creepage distance of the insulator. Also, a technique is known wherein the whole ceramic insulator having a penetration hole and an optical fiber therein are heated and a molten glass is poured in the whole or a portion of the penetration hole to seal the optical fiber in the penetration hole.

However, in the abovementioned sealing with an organic material, the organic sealing material and the ceramic insulator body have a such a large difference in thermal expansion coefficients from each other, that problems occur in that deterioration of the organic sealing material is accelerated and the optical fiber is occasionally broken by a thermal stress generated by temperature change while in use. Moreover, the organic sealing material has a problem in that it is liable to incur tracking, etc., during a long use, so that it has a poor reliability when used for a long time.

Also, in the abovementioned sealing with the inorganic material or glass, the whole ceramic insulator has to be heated, so that problems occur in that a large apparatus is required to increase the investment cost and a large amount of electric power is consumed, and increases costs. Moreover, when heating the whole insulator and the optical fiber for melting the glass, problems occur in that the coating of the optical fiber is scorched, so that the optical fiber is liable to break down and the structure of extending the optical fiber from the ends of the insulator can hardly be obtained. For obviating these problems, surfaces of the optical fiber exposed at the end surfaces of the insulator after sealed by the glass have to be optically polished and adhered by means of Ferrule, etc., so that other problems such as complicated and expensive production steps arise.

In order to solve the above problems, the applicant proposed in their Japanese Patent Application Laid-open No. 1-246,724 (U.S. Pat. No. 4,921,322) two sealing methods, as shown in the attached FIGS. 4 and 5.

In the sealing method as shown in FIG. 4, an insulator 31 and an optical fiber 3 are fixed by jigs 26A, 26B for fixing the insulator 31 and jigs 24A, 24B for fixing the optical fiber 3. These jigs are constructed in such a fashion that their vertical and horizontal spacings can be adjusted depending on the positions of the insulator 31 and the optical fiber 3. For the insulator 31 which has finished preliminary heating thereof are arranged an induction heating furnace 21 for melting a glass, a hot air blower pipe 22, and a cooling pipe 23. Next, an upper end of the insulator 31 is heated by hot blow of a temperature of, for example, 550° C.+20° C., from the hot air blower 22 for 5 min., and then filled with a sealing glass of a desired composition melted at, e.g., 500° C. in the induction heating furnace 21 to a sealing portion in the penetration hole. After filling a desired amount of the sealing glass to finish the sealing operation at the end of the insulator 1, the insulator 1 is turned over and the same glass-filling operation as described above is performed on the lower end portion of the insulator 1 to complete the sealing process. The cooling pipe 23 is used for preventing heating of the jigs 24A, 24B which fix the optical fiber 3.

However, even the method of FIG. 4 has the following drawbacks. Namely, when the inorganic glass is filled in the sealing portion after melted by heating, the neighboring portion of the ceramic insulator 1 around the inorganic glass can be heated below the temperature of the inorganic glass and insufficiently expanded, though the glass is preliminarily heated by the hot blow. As a result, when the inorganic glass is cooled and solidified, a tensile stress is exerted on the inorganic glass and the neighboring portion of the ceramic insulator 1, so that a crack is liable to form in the sealing inorganic glass. Moreover, it is difficult to keep the heated and melted inorganic glass in a constant state. Furthermore, when filling the heated and melted inorganic glass in the sealing portions of the penetration hole, there is a high risk of damaging the optical fiber 3, such as scorching the coating portion of the optical fiber 3.

In the sealing method as shown in FIG. 5, a preliminary sealing member 41 is formed at first. That is, at a position of the optical fiber 3 corresponding to the end portion of the penetration hole 2, an electrically conductive ceramic or metallic tube 37 having an outer diameter capable of being inserted in the penetration hole 2 is provided, and a spacer 5 and a sealing glass 34 are provided in the tube 37 to form the preliminary sealing member 41 for sealing the optical fiber 3 therein.

Next, the optical fiber 3 with the preliminary sealing member 41 therearound is inserted in the penetration hole 2 of the insulator 1 to locate or position the preliminary sealing member 41 at the end portion of the penetration hole 2, as shown in FIG. 5. At this time, a sealing glass 34 preferably of a paste state should be intervened between the outer circumferential surface of the tube 37 of the preliminary sealing member 41 and the inner circumferential surface of the penetration hole 2. Thereafter, a high frequency induction heating device 42 is positioned at a position corresponding to the end portion of the penetration hole 2 and high frequency induction heating is effected. The electrically conductive ceramic or metallic tube 37 is induction heated, so that the sealing glass 34 arranged between the outer circumferential surface of the tube 37 of the preliminary sealing member 41 and the inner circumferential surface of the penetration hole 2 is melted to complete the sealing operation. Thereafter, a protecting member for protecting the sealed end portion, such as silicone rubber, etc., is provided on the sealed end portion around the optical fiber 3.

However, even the method of FIG. 5 has drawbacks in that the portion of the ceramic insulator 1 around the inorganic glass can be heated below the temperature of the inorganic glass, so that a thermal stress is generated between the inorganic glass 34 and the neighboring portion of the ceramic insulator 1 to occasionally form a crack in the sealing inorganic glass 34 when the glass 34 is cooled and solidified. Moreover, the inorganic glass 34 used between the ceramic insulator 1 and the electrically conductive ceramic or metallic tube 37 is liable to peel from the tube 37 at the bonded interface thereof than from the insulator 1 at the bonded interface thereof during a long use, so that it has poor reliability of the bonding portion. Furthermore, positioning the tube 37 at a desired position in the penetration hole 2 is difficult and may damage optical fiber 3 and the tube 37, which are difficult to can hardly be uniformly heat. Furthermore, the tube 37 has to be formed to a desired shape beforehand, a high frequency induction heating device has to be used for heating the tube 37, and the inorganic glass 34 has to be applied, calcined and baked on the tube 37, so that production steps are difficult, cumbersome and too numerous.

SUMMARY OF THE INVENTION

An object of the present invention is to provide an optical fiber built-in type composite insulator which can eliminate crack formation in the inorganic glass sealing portion and the neighboring portion of the ceramic insulator with decreased number of production steps and simplified production apparatus.

Another object of the present invention is to provide a production method of such composite insulator.

A further object of the present invention is to obviate the abovementioned problems and drawbacks.

Now, the above objects can be achieved by the present invention.

The present invention is an optical fiber built-in type composite insulator, including a ceramic insulator having a penetration hole arranged in the central axis portion, at least one optical fiber inserted in the penetration hole, and sealing portions made of inorganic glass arranged at both ends of the penetration hole for sealing the optical fiber therein, comprising recessed portions of the ceramic insulator arranged around the ends of the penetration hole, and heat generating elements arranged in the recessed portions for heating and melting the inorganic glass to form the sealing portions at the both ends of the penetration hole.

Also, the present invention is a method of producing an optical fiber built-in type composite insulator including the steps of inserting an optical fiber in a central axis penetration hole of a ceramic insulator to receive the optical fiber therein, and sealing both ends of the penetration hole receiving the optical fiber by means of an inorganic glass to form sealing portions at both ends of the penetration hole, comprising, providing recessed portions in the ceramic insulator around the ends of penetration hole, arranging heat generating elements in the recessed portions, and heating and melting the inorganic glass to form the sealing portions at both ends of the penetration hole.

BRIEF DESCRIPTION OF THE DRAWINGS

For a better understanding of the present invention, reference is made to the accompanying drawings, in which:

FIG. 4 is a schematic front view of a prior apparatus for sealing an optical fiber in a penetration hole of a ceramic insulator at the end thereof by means of an inorganic glass; and FIG. 5 is a schematic partial cross-sectional view of another prior apparatus for sealing an optical fiber in a penetration hole of a ceramic insulator at the end thereof by means of an inorganic glass.

Figure 1:
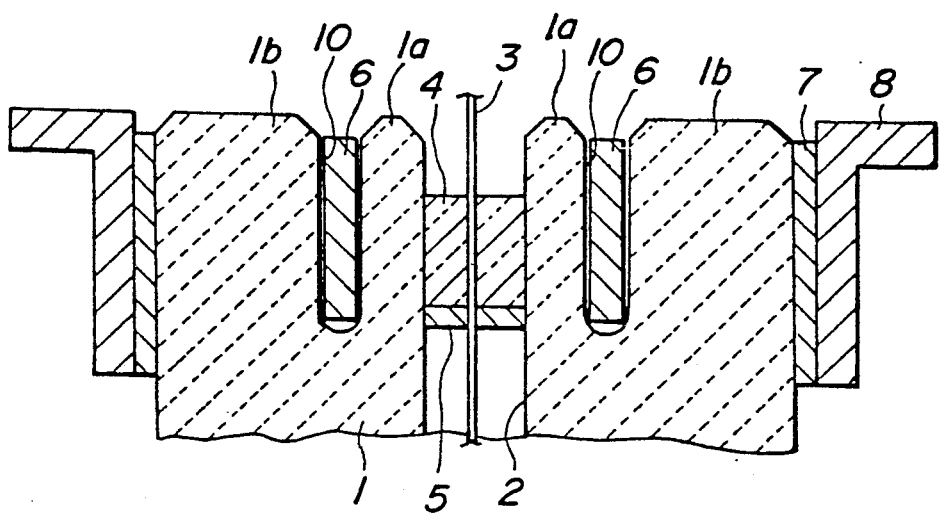
FIG. 1 is a schematic enlarged partial cross-sectional view of an embodiment of the present composite insulator showing a state of arranging an inorganic glass in a recessed portion of a ceramic insulator around an end of a penetration hole of the ceramic insulator.

| | Number in the Drawings |
|---|---|
| 1,31 | ceramic insulator |
| 1a | protrusion |
| 1b | end portion of the ceramic insulator |
| 2 | penetration hole for receiving the optical fiber 3 |
| 3 | optical fiber |
| 4 | calcined inorganic glass |
| 5 | spacer for preventing flow of inorganic glass |
| 6 | ring shaped heat generating element |
| 7 | cement (adhesive layer) |
| 8 | flange type metallic fitting |
| 10 | ring shaped groove for receiving the heater 6 |
| 16 | columnar heat generating element |
| 20 | round bore for receiving the heat generating element 16 |

DESCRIPTION OF THE PREFERRED EMBODIMENTS

Figure 2:
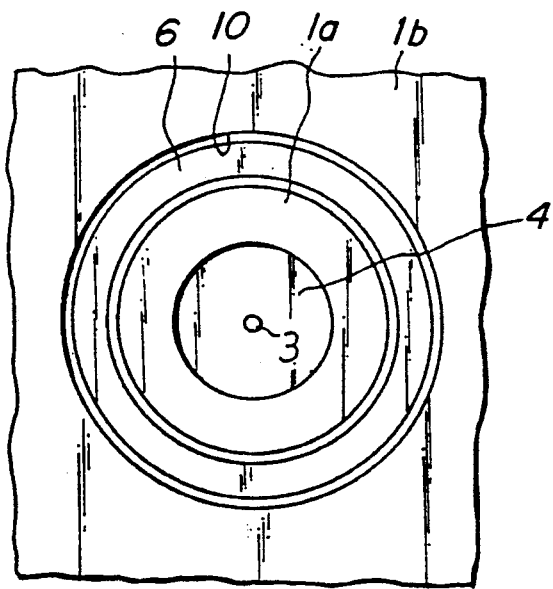
FIG. 2 is a plan view thereof.

Referring to FIGS. 1 and 2, an enlarged cross-sectional view and an enlarged plan view of an end portion of the present composite insulator are shown.

In FIGS. 1 and 2, a ceramic insulator 1 has a penetration hole 2 for receiving an optical fiber 3, an inorganic glass 4 is arranged at an end of the penetration hole 2, and a spacer 5 is arranged below the inorganic glass 4 in the penetration hole 2 to prevent flow of the inorganic glass 4. The inorganic glass 4 is preferably a calcined body having a hole for allowing penetration of the optical fiber 3 therethrough and a diameter corresponding to the inner diameter of the penetration hole 2. Around the upper end portion of the penetration hole 2 is provided a ring-shaped or circular groove 10 which receives and fixes a ring-shaped heat generating element 6 therein. The upper end portion 1b of the ceramic insulator 1 is held by a flange type metallic fitting 8 via an adhesive layer 7.

The ring-shaped groove 10 may be formed at the time of forming the ceramic insulator 1 or it may be formed by working by grinding, etc., after the forming or firing of the ceramic insulator 1. The heat generating element 6 has a shape fitted to the shape of the groove 10 and is desirably a heater made of an iron-chromium-aluminum series alloy or a nickel-chromium series alloy having a high heat generation power.

When providing a sealing portion in the penetration hole 2 at the upper end of the ceramic insulator 1, an electric current is applied to the heat generating element 6 to generate heat therefrom so as to heat and melt the inorganic glass 4 through the protrusion 1a, and thereafter the application of the electric current to the heat generation element 6 is turned off to cool and solidify the melted inorganic glass 4 whereby a sealed portion made of the inorganic glass 4 is formed.

The same operation as described above is effected on the lower end of the ceramic insulator 1 to provide another sealing portion in the lower end of the penetration hole 2. The second operation may be effected sequentially after the first operation.

According to the production method of this embodiment, the neighboring portion or the protrusion 1a of the ceramic insulator 1 around the inorganic glass 4 is always maintained at a higher temperature than the inorganic glass 4 during heating and melting the inorganic glass 4. Therefore, the protrusion 1a is expanded not less than the inorganic glass when the inorganic glass 4 is melted, and the inorganic glass 4 solidifies and shrinks with a similar shrinkage of the protrusion 1a after sufficient expansion of the protrusion 1a. As a result, no tensile stress is exerted on the inorganic glass 4 and the surrounding protrusion 1a, and thus cracking is curtailed. Therefore, reliability of the sealing property of the sealing portion can be remarkably improved, and fraction defective or percentage of rejected products can be reduced, so that yield of the products can be noticeably elevated.

Moreover, the ceramic insulator 1 and the inorganic glass 4 can be directly bonded without an intervening metallic tube, etc., so that peeling off, etc., of the inorganic glass 4 from the ceramic insulator 1 at the interface thereof scarcely occurs to improve the reliability of the sealing portion made of the inorganic glass 4, particularly the reliability of the sealing portion for a long period of use.

Furthermore, the inorganic glass 4 is arranged at a desired position in the end portion of the penetration hole 2 and heated by a heat generating element 6 arranged with an appropriate spacing from the inorganic glass 4 to heat and melt the calcined body of the inorganic glass 4, so that the number of requisite materials, members and devices necessary for the production or sealing are small and the production steps are reduced. Therefore, the sealing portions made of inorganic glass can be quite simply and economically formed.

The spacing of the heat generating element 6 from the inorganic glass 4 is preferably 5–20 mm.

In order not to decrease the mechanical strength of the ceramic insulator 1, a ratio of the outer diameter of the circular groove 10 to the diameter of the ceramic insulator 1 is preferably not more than 0.5, and a ratio of the depth of the groove 10 to the length of the flange type metallic fitting 8 is preferably not more than 0.75.

After finishing the sealing step using the inorganic glass, the circular groove 10 is preferably removed of the heat generating element 6 and filled with a waterproof material to prevent invasion of water, etc. As the waterproof material, silicone rubber is preferably used, because it can prevent invasion of water, etc., without suffering from deterioration due to water, ozone, and ultraviolet ray, etc., and without forming an internal crack and peeling-off at the bonded surface due to expansion and shrinkage thereof caused by temperature change in use environment.

Coefficient of thermal expansion of the inorganic glass 4 is preferably smaller than that of the ceramic insulator 1, so that a compression stress is always exerted on the sealed portion made of the inorganic glass 4 after the sealing. When heating and melting the inorganic glass 4, preferably the inorganic glass 4 arranged in the end of penetration hole 2 is burdened with a pressure from both the upper and/or lower sides, so that the level of the inorganic glass after the sealing can always be maintained constant and the bonding strength of the inorganic glass 4 to the ceramic insulator 1 can be improved.

In order not to scorch the coating of the optical fiber 3 extending from the end portion of the penetration hole 2 to the exterior, when heating and melting the inorganic glass 4, the extended portion should always be cooled during heating.

If an end-protective member made of e.g., silicone rubber, epoxy resin, etc., is formed on the outer periphery of the extended portion of the optical fiber 3 after the sealing, the damage of the optical fiber by means of external force can be prevented.

The spacer 5 for stopping the downward flow of the molten inorganic glass 4 is preferably made of Kovar, iron-nickel series alloy, ceramic material or inorganic fibers having a substantially same coefficient of thermal expansion as that of the sealing inorganic glass 4.

Figure 3:
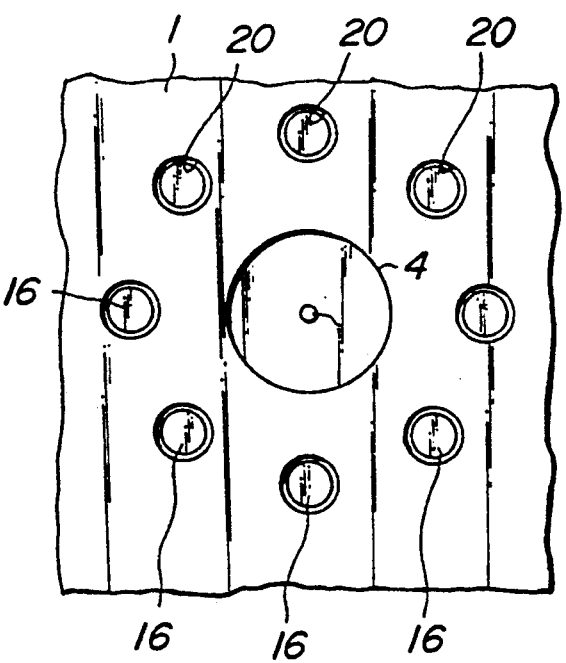
FIG. 3 is a plan view of another embodiment of the present composite insulator.

In the embodiment shown in FIG. 3, a plurality (8 in the drawing) of columnar bores 20 are arranged around the penetration hole 4 instead of the circular groove 10. Each bore 20 receives a columnar heat generating element 16, respectively, which generates heat for heating and melting the calcined body of the inorganic glass 4.

Hereinafter, the present invention will be explained in more detail with reference to examples with numeral values.

According to the methods as shown in FIGS. 1, 4 and 5, an inorganic glass sealing portion is produced, respectively.

In the method as shown in FIG. 1, the ceramic insulator 1 has a diameter of 105 mm, and a length of 1,100 mm, and the circular groove 10 has an outer diameter of 30 mm, a width of 7 mm, and a depth of 30 mm. The inorganic glass 4 is made of a lead borate glass having a low melting point and has a spacing of 5 mm from the heat generating element 6. The inorganic glass is melted at 500° C. and left to cool and solidify.

The insulators having the sealing portions of FIGS. 1, 4 and 5 are evaluated on opposite hours required for the sealing and reliability of the sealing property. The results are shown in the following Tables 1 and 2.

TABLE 1

| Sealing method | Operation Hours |
|---|---|
| | Operation hours (Relative value) |
| FIG. 4 | 100 |
| FIG. 5 | 100 |
| FIG. 1 | 55 |

TABLE 2

| | Reliability of Sealing | | | | |
|---|---|---|---|---|---|
| | Initial trouble | Trouble rate after repeated thermal shock test (%) | | | |
| Sealing method | rate (%) | 2000 cycle | 3000 cycle | 4000 cycle | 5000 cycle |
| FIG. 4 | 35 | 0 | 20 | 30 | 45 |
| FIG. 5 | 20 | 0 | 0 | 15 | 30 |

TABLE 2-continued

| | Reliability of Sealing | | | | |
|---|---|---|---|---|---|
| | Initial trouble | Trouble rate after repeated thermal shock test (%) | | | |
| Sealing method | rate (%) | 2000 cycle | 3000 cycle | 4000 cycle | 5000 cycle |
| FIG. 1 | 0 | 0 | 0 | 0 | 0 |

Note:
Each value of trouble rate is expressed by percentage of occurred leakage in the whole tested number.

Thermal shock tests shown in the above Table 2 are effected by repetition of a cycle of holding the insulator samples in a hot bath of 80° C. for 30 min. and in a cold bath of −20° C. for 30 min. Each value of the initial trouble rate % is shown by a percentage of cracked samples detected by a fluorescent damage-detecting test in the whole number of 20 insulator samples. Each value of trouble rate after repeated thermal shock test is shown by a percentage of He-leaked samples in the whole number of 20 insulator samples containing He gas sealed in the central portion of the penetration hole 2, after repetition of desired cycles of thermal shock test.

As seen from the above Tables 1 and 2, according to the present invention, the sealing operation can considerably be simplified and shortened, the initial trouble rate and the trouble rate after repeated thermal shock can substantially be eliminated, and the durability and the reliability of the composite insulator for a long period of use can appreciably be improved by prevention of crack in the sealing portion.

As described in detail in the foregoing explanations, according to the present invention, a recessed portion is arranged in the end portion of the ceramic insulator around the penetration hole receiving the optical fiber and the inorganic glass, the heat generating element is received in the recessed portion, and the heat generating element is heated to melt the inorganic glass, so that the neighboring portion of the ceramic insulator around the inorganic glass can be held to a higher temperature than the temperature of the inorganic glass during heating and melting the inorganic glass. Hence, the neighboring portion of the ceramic insulator around the inorganic glass is expanded not less than the inorganic glass prior to the cooling and solidification of the inorganic glass, and shrinks with a substantially same extent simultaneously with the shrinkage and solidification of the inorganic glass. As a result, a tensile stress is not exerted on the inorganic glass nor on the neighboring portion of the ceramic insulator, so that substantially no cracks are formed. Therefore, the reliability of the sealing property of the sealing portion can exceedingly be improved, and the percentage of rejected products can be much reduced.

Moreover, the inorganic glass arranged in the end portion of the penetration hole receiving the optical fiber is heated and melted to form an inorganic glass sealing portion, so that a metallic tube, etc., needs not be interposed between the inorganic glass and the insulator and can be dispensed with. Therefore, the problems of peeling off of the inorganic glass from the metallic tube at the bonded interface thereof, etc., can be prevented to materially improve the reliability of the sealing property of the sealing portion, particularly the sealing property of the sealing portion during a long period of use.

Furthermore, the simple structure of receiving the heat generating element in the recessed portion and heating it to melt the inorganic glass affords reduced materials, members and devices required for the sealing as well as a reduced number of production steps. Therefore, the present invention can produce the inorganic glass sealing portion quickly, simply and economically.

Although the present invention has been explained with specific examples, it is of course apparent to those skilled in the art that various changes and modifications thereof are possible without departing from the board spirit and aspect of the present invention as defined in the appended claims.

What is claimed is:

1. An optical fiber built-in type composite insulator, comprising:
    a ceramic insulator body having a penetration hole in its axis portion;
    at least one optical fiber inserted in said penetration hole;
    inorganic glass sealing portions disposed substantially at each end of said penetration hole for sealing said optical fiber therein; and
    at least one recessed portion disposed around said each end of said penetration hole in said ceramic insulator body for receiving at least one heat generating element in each of said at least one recessed portion, said at least one heat generating element being disposed to heat and melt inorganic glass to form said inorganic glass sealing portions.

2. A method of producing an optical fiber built-in type composite insulator, comprising the steps of:
    inserting at least one optical fiber in a central axis penetration hole of a ceramic insulator body;
    sealing each end of said penetration hole with said at least one optical fiber disposed therein to form sealing portions at said each end of said penetration hole, said sealing comprising the steps of:
    a) providing at least one recessed portion in said ceramic insulator body around said each end of said penetration hole;
    b) arranging at least one heat generating element in each of said at least one recessed portion; and
    c) heating and melting inorganic glass in said penetration hole substantially near said each end of said penetration hole to form inorganic glass sealing portion at said each end of said penetration hole.

* * * * *